UNITED STATES PATENT OFFICE.

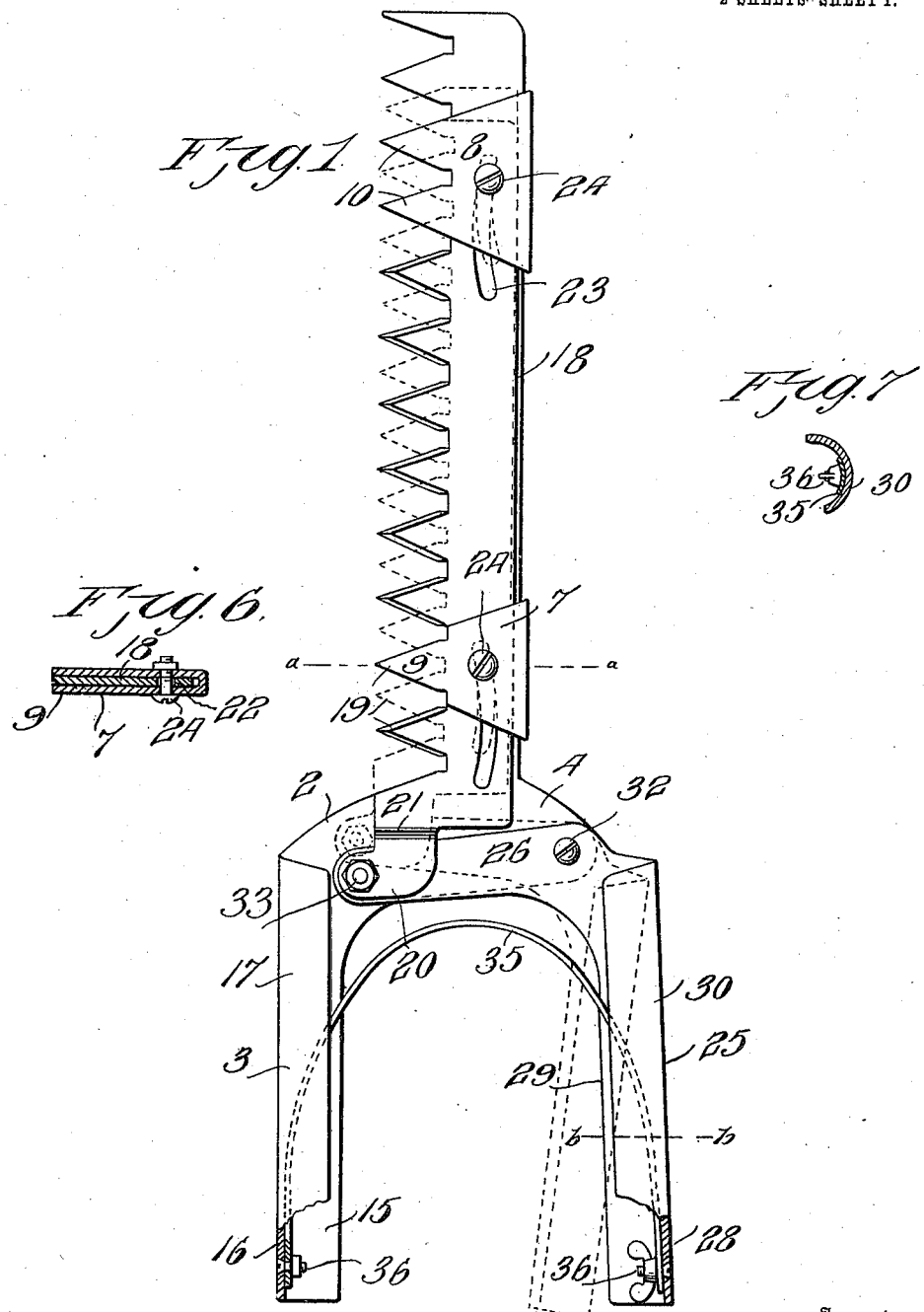

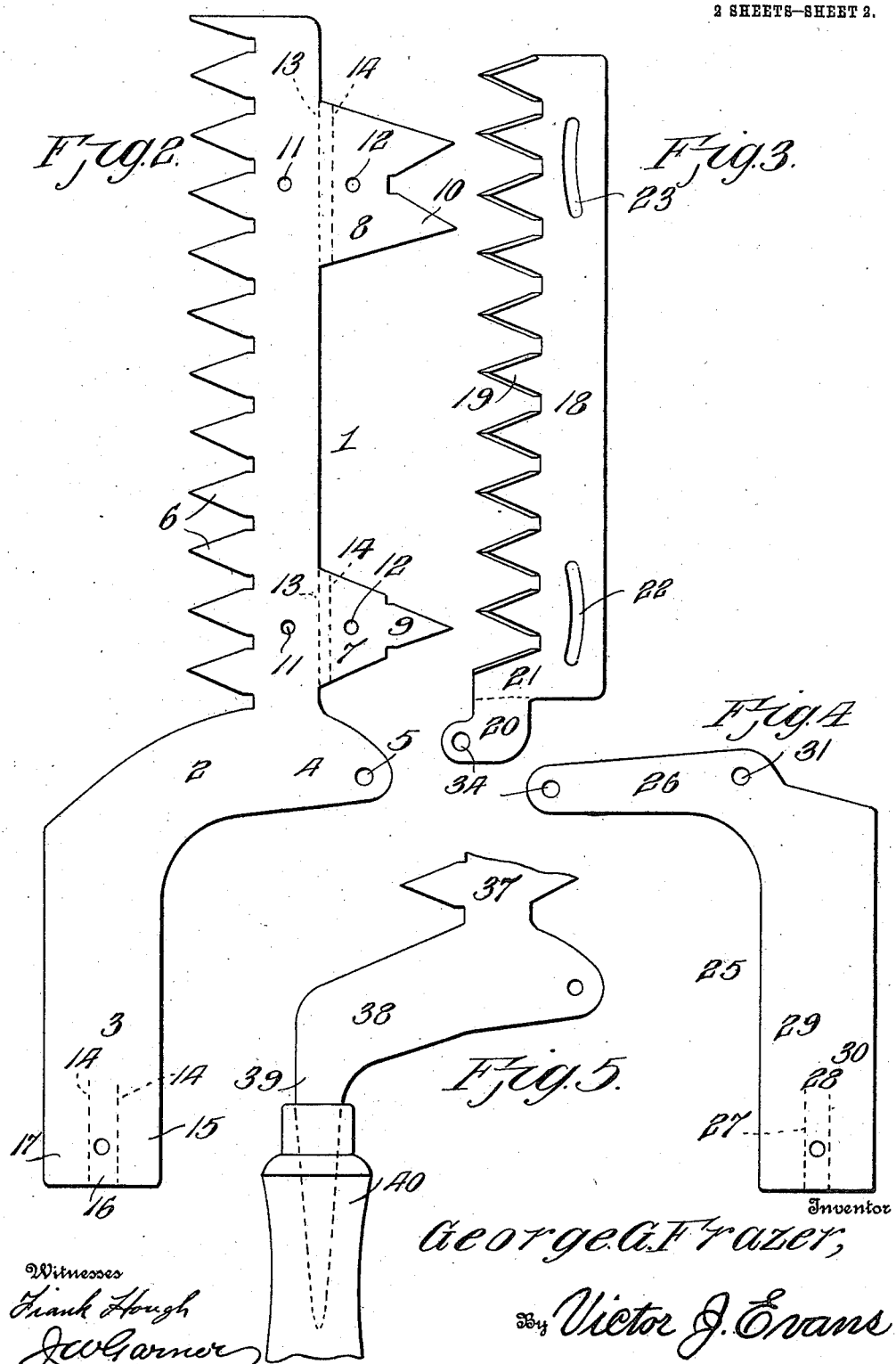

GEORGE G. FRAZER, OF ST. LOUIS, MISSOURI.

LAWN AND HEDGE TRIMMER.

974,653.    Specification of Letters Patent.    Patented Nov. 1, 1910.

Application filed January 22, 1909. Serial No. 473,742.

*To all whom it may concern:*

Be it known that I, GEORGE G. FRAZER, a citizen of the United States, residing at St. Louis, in the State of Missouri, have invented new and useful Improvements in Lawn and Hedge Trimmers, of which the following is a specification.

This invention relates to improvements in lawn and hedge trimmers and consists in the construction, combination and arrangement of devices hereinafter described and claimed.

One object of the invention is to provide an improved lawn and hedge trimmer which comprises essentially a guard having cutter teeth and a cutter bar also provided on the teeth and handles and operating connections for operating said cutter bar.

A further object is the provision of an improved device of this character in which the operating parts are made of plate metal stamped up into shape at very slight cost so that the device while being extremely efficient in use is also capable of being manufactured at very slight expense.

In the accompanying drawings:—Figure 1 is a plan of a lawn and hedge trimmer constructed in accordance with my invention. Fig. 2 is a detail plan of the blank from which the guard bar is formed. Fig. 3 is a similar view of the cutter bar. Fig. 4 is a similar view of the blank from which the handle is formed. Fig. 5 is a similar view illustrating a modification. Fig. 6 is a detail transverse sectional view taken on the plane indicated by line *a—a* of Fig. 1. Fig. 7 is a similar view taken on the plane indicated by line *b—b* of Fig. 1.

In accordance with my invention, the guard bar 1 is formed from a piece of plate steel of suitable thickness, an arm 2 being formed at the inner end of said bar extending transversely therefrom and a handle portion 3 being formed at the outer end of said arm and parallel with the guard bar. The said arm 2 extends forwardly and curves outwardly from the inner end of the guard bar and is integral therewith, the handle portion 3 being also integral, and at the rear end of the arm 2 and inner end of the guard bar is a rearwardly extending lug 4 which forms in effect a rearward extension of said arm 2 and is provided with an opening 5. Ledger teeth 6 are formed integral with and extend forward from the guard bar. On the rear side of the guard bar and formed integrally therewith are guard or guiding arms 7, 8, which are respectively near the inner and outer ends of said guard bar. Said guiding arms are respectively formed at their outer ends with teeth 9, 10 and said guiding arms are first bent upwardly from the guard bar a short distance and then forwardly and disposed parallel therewith so that they lie spaced from but comparatively close to the upper side of the guard bar and their teeth 9, 10 lie above certain of the teeth 6. The said guard bar is provided with bolt holes 11 and the said guiding arms are provided with bolt holes 12 which aline with the holes 11.

The dotted lines 13, 14 on Fig. 2 of the drawing indicate the points at which the guiding arms are bent. The handle portion 3 is bent longitudinally at the points indicated by the dotted lines 14 in Fig. 2 so that the guard bar 1 is formed with a hollow handle 3 at its inner end opening on its inner or rear side and comprising a web 15, an intermediate portion 16 and a web 17, the latter partly overlying the web 15. The cutter bar 18 is also formed from a single piece of plate steel and has cutter teeth 19 at its front edge. At the inner end of the said cutter bar is an arm 20 which is bent at the point 21 upwardly a short distance and then bent parallel with the said bar 18 and hence is disposed at a slight distance from the arm 2 and above the same. The said cutter bar is provided near its ends with reversely curved slots 22, 23, which when the cutter bar is disposed on the guard bar and under the arms 7, 8, register with the bolt holes 11 and 12 and securing bolts 24 are then passed through said bolt holes thus serving to connect the cutter bar to the guard bar to permit longitudinal movement of the cutter bar and also enabling the guiding arms 7, 8, to be adjusted toward and from the guard bar so that the cutter bar may be always clamped as closely to the upper surface of the guard bar as may be required to secure the best effect and enable the teeth of the guard and cutter bars to effectually cut the grass, trim hedges, shrubbery, flowers or other plants. As the guard bar and cutter bar wear the bolts 24 may be tightened from time to time to compensate for the wear and also keep the cutting teeth of the cutting plate and guard bar in contact with one another.

Owing to the curved slots 22, 23, the cutter bar while moving longitudinally is also caused to move laterally to a slight extent and hence the cutting or shearing action of the teeth of the guard or cutter bars is greatly increased as different portions of the surfaces of their cutting edges are thereby presented to the grass or other material that is being cut.

The handle 25 which operates the cutter bar is formed from a single piece of plate metal as shown in Fig. 4, an arm 26 being formed integrally with and at the inner end of said handle. The latter is bent on the lines 27 to form a central portion 28, the web 29 and an upper overhanging web 30. A hole 31 is made at the inner end of the arm 26 for the reception of a bolt 32 which also passes through the hole 5 of the guard bar lug 4 and hence serves to pivot the handle 25 at the inner end of the guard bar. A bolt 33 pivotally connects the arm 26 of the handle 25 to the arm 20 at the inner end of the cutter bar and passes through openings 34 with which said arms are provided. A slight degree of play is permitted this bolt 33 to compensate for the angular movement of said arm 26 as will be understood.

Between the handles 3 and 25 I place a spring 35 the ends of which lie against the intermediate portions of said handles and are secured thereto as at 36. The function of this spring is to move the handle 25 from the handle 3 so that the operator who grasps both handles has only to move the handle 25 in one direction with his fingers and permit the spring to move the said handle in the reverse direction as his fingers open from his hand and hence the said handle 25 by means of its connections heretofore described with the cutter bar causes the latter to describe reciprocatory movement.

Instead of forming the handle of the guard bar integrally therewith it may be formed separately therefrom. In Fig. 5, I illustrate such a modification, the inner end of the guard bar being indicated at 37, the inner arm thereof at 38 and a prong or tang being shown at 39 formed at the upper end of said bar 38, which tang or prong enters the handle 40.

My improved lawn and hedge trimmer is very useful for trimming lawns under and around shrubbery, flowers and in other places inaccessible to a lawn mower and is also exceedingly useful for trimming hedges, shrubbery and the like.

My improved lawn and hedge trimmer is exceedingly light, cheap, strong and durable and may be readily assembled and disassembled and in the event that any one of its parts should become worn or broken, the same may readily be replaced by another at very slight expenses.

What is claimed is:—

A lawn and hedge trimmer comprising a guard bar provided at one end with a handle offset from its front side and a lug offset from its rear side, said bar also being provided along its front edge with integral longitudinal teeth and upon its rear edge with integral guide arms, said guide arms being folded over to a position parallel with said bars, a reciprocating cutter bar having longitudinal teeth on one edge to coöperate with the aforesaid teeth of the guard bar and provided with longitudinal slots and with an angularly bent arm at its rear end, bolts passing through the slots in the cutter bar and openings in the guard bar and guide arms, a handle pivoted to the lug of the first-named handle having an arm pivotally connected with the angular arm of the cutter bar, and a spring disposed between the handle and acting to normally maintain the guard bar and cutter bar in a prescribed relative position.

In testimony whereof I affix my signature in presence of two witnesses.

GEORGE G. FRAZER.

Witnesses:
P. CONSTAM,
HENRY L. YONKER.